Sept. 29, 1964 A. R. HABAYEB 3,151,253

MONOSTABLE TUNNEL DIODE LOGIC CIRCUIT WITH THE OUTPUT PULSE AMPLITUDE PROPORTIONAL TO THE INPUT PULSE AMPLITUDE

Filed Dec. 29, 1960

INVENTOR.
ABDUL R. HABAYEB
BY
Fred Jacob
ATTORNEY

United States Patent Office 3,151,253
Patented Sept. 29, 1964

3,151,253

MONOSTABLE TUNNEL DIODE LOGIC CIRCUIT WITH THE OUTPUT PULSE AMPLITUDE PROPORTIONAL TO THE INPUT PULSE AMPLITUDE

Abdul R. Habayeb, Lawrence, Kans., assignor to Minneapolis-Honeywell Regulator Company, Minneapolis, Minn., a corporation of Delaware Filed Dec. 29, 1960, Ser. No. 79,324
16 Claims. (Cl. 307—88.5)

The present invention relates in general to new and improved logic circuits, in particular to tunnel diode logic circuits which have more than two stable states.

Present-day digital computers are predominantly used to carry out computations with binary logic, i.e., with a number system which employs the base of 2. The reason for this widespread acceptance of binary logic stems from the fact that the active circuit element heretofore available, e.g., transistors, conventional diodes, etc., readily lend themselves to such use because of their inherent ability to exist in one of two stable states. It has long been recognized that certain types of computations are more advantageously carried out in a number system which employs a base other than 2. The advantages derived lie primarily in the reduced amount of equipment which is required to carry out the equivalent computation in the new number system.

Heretofore, fast-acting, multistable circuits, which are defined herein as circuits which have more than two stable states, were neither sufficiently reliable nor sufficiently economical to warrant widespread use. As a result, relatively little progress was made in the field of multistable computation. With the advent of tunnel diodes, however, renewed interest has been simulated in circuits of this type.

The term tunnel diode is applied to a thin, highly doped, semi-conductor junction which is capable of providing very high switching speeds of the order of fifty times that of the fastest presently available transistors. This is due to the tunneling effect which theoretically occurs at the speed of light. A typical tunnel diode has a current-voltage characteristic which displays a negative resistance range that is located between a pair of positive resistance regions and which is separated from the latter by a pair of instability points. The instability points have corresponding peak and valley current levels which, when exceeded, cause the diode operation to switch substantially instantaneously to a different positive resistance region of the diode characteristic. Owing to this property, a tunnel diode may be used in simple circuits to perform relatively complex logic functions heretofore carried out by circuits using at least one transistor and/or one or more diodes.

One of the problems associated with tunnel diode circuits is the necessity for resetting the diode to its original state after it has been switched. If a separate signal is required to carry out this operation, it must be synchronized with the input signal. Since tunnel diode operation generally occurs at very high speeds, the advantages in economy and reliability are often offset by the high precision circuit which is required to synchronize the two signals.

When two or more tunnel diodes are connected in series, a composite characteristic of the series diode combination is obtained which is composed of the individual diode characteristics. Multistable tunnel diode circuits which employ a plurality of like-poled diodes connected in series are discussed in detail in a copending application of the inventor herein filed December 29, 1960, Serial Number 79,319, which is assigned to the assignee of the instant application. Such tunnel diode circuits operate in a single quadrant of the current-voltage characteristic graph, i.e., the resultant voltage applied across the diode combination and the current flow through the diode combination always have the same polarity.

The circuit which constitutes the subject matter of this invention employs a back-to-back tunnel diode connection in order to take advantage of diode operation in the positive, as well as in the negative quadrants of the composite characteristic. Dual polarity logical operations may be performed with such a circuit and, for certain operating conditions, a smaller number of tunnel diodes is required to obtain a specified number of stable states. This is achieved without any sacrifice in the logical gain, the circuit being additionally capable of resetting itself to its initial stable state.

Accordingly, it is the primary object of this invention to provide an improved multistable tunnel diode circuit which is capable of performing logic functions.

It is another object of this invention to provide an improved multistable tunnel diode logic circuit which has relatively large logical gain.

It is a further object of this invention to provide an improved multistable tunnel diode logic circuit which is capable of restoring itself to its initial stable state.

It is an additional object of this invention to provide a simple and reliable tunnel diode circuit which is capable of multistable operation to carry out dual polarity logic functions.

The various novel features which characterize the invention are pointed out with particularity in the claims annexed to and forming a part of this specification. The invention itself, its operation, its advantages and specific objects thereof, will become clear with reference to the following detailed description and the accompanying drawings in which:

Figure 1:
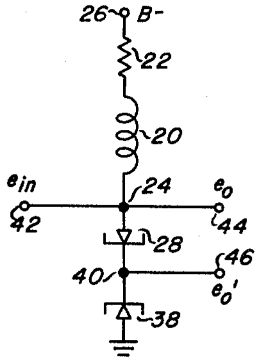
FIGURE 1 illustrates a preferred embodiment of the invention.

With reference now to the drawings, a preferred embodiment of the invention is illustrated in FIGURE 1 and is seen to have an inductive impedance 20 which is connected in series to a resistive impedance 22. The free terminal of the inductive impedance is connected to a junction point 24, while the free terminal of the resistive impedance is connected to a bias terminal 26. Two tunnel diodes 28 and 30 are connected in back-to-back relationship to each other, i.e., they are oppositely poled and series-connected with the diode cathodes tied to a common connecting point 40. The diodes are preferably identical so as to have identical peak and valley currents in response to identical voltage swings. The anodes of the diodes are connected to the junction point 24 and to ground respectively. A negative D.C. bias voltage B— is applied beween the terminal 26 and ground. An input terminal 42 is connected to the aforesaid junction point 24 and is adapted to receive an input signal $e_{in}$ thereon. Two output terminals 44 and 46 are respectively connected to the junction point 24 and to the common connection point 40, so as to provide output signals $e_o$ and $e_o'$ respectively.

The time constant of the circuit is $L/R_t$, where L is the value of the inductance 20 and $R_t$ is the total resistance of the circuit. Because the inductance opposes an instantaneous energy transfer, the time constant determines the rate at which the current at the junction point 24 changes. Since the logical gain of the circuit may be varied by varying the width of the output pulses, it will be clear that the circuit gain is a function of L.

Figure 2:
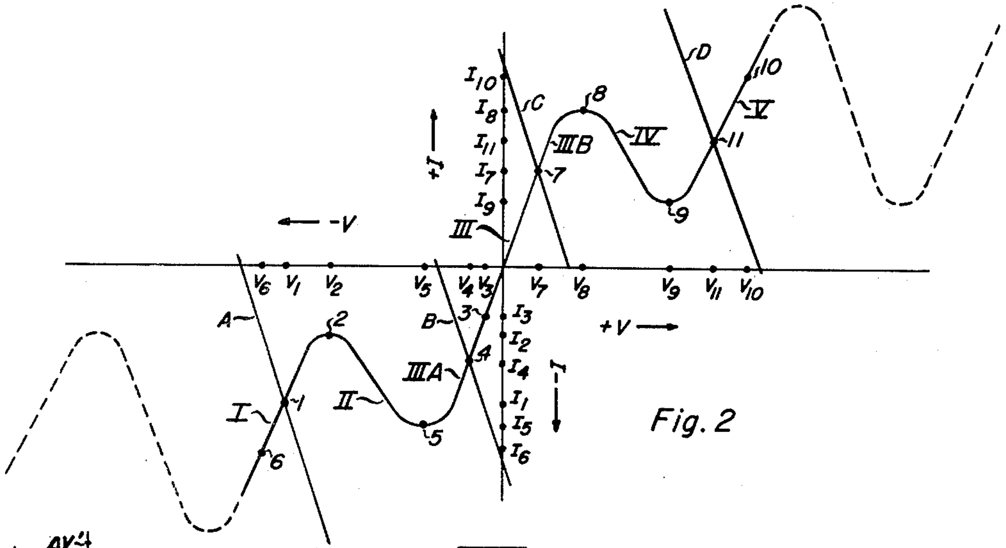
FIGURE 2 illustrates a composite diode characteristic of the embodiment of FIGURE 1.

FIGURE 2 illustrates the composite characteristic of the tunnel diode combination of FIGURE 1. It will be noted that the composite characteristic is a continuous curve which passes through the intersection of the current and voltage axes, i.e., through the zero point of the graph. The composite characteristic contains three positive resistance regions I, III and V in which table operation may occur. The positive resistance region III, which extends through the origin of the graph of FIGURE 2, contains negative and positive polarity portions IIIA and IIIB respectively. The composite characteristic further includes a pair of negative resistance regions II and IV which are located between the positive resistance regions and which are separated from the latter by the respective peak and valley instability points 2, 5 and 8, 9 respectively. The current and voltage values which correspond to the instability points have appropriately numbered subscripts.

The composite characteristic of the diode combination is composed of the individual diode characteristics. That portion of the composite characteristic which includes the regions I, II and III, is contributed by the tunnel diode 38. The remaining portion of the composite characteristic which is made up of the regions III, IV and V is attributable to the tunnel diode 28. The reason that no discontinuity occurs in the positive resistance region III which is common to both portions of the composite characteristic is due to the fact that each individual diode characteristic normally extends through the zero point. In practical terms, this means that each tunnel diode characteristic includes a reverse bias region in addition to the positive portion in which the diode is predominantly active. Within this region, the application of a negative voltage will produce a negative current that is considerably larger than the positive current produced by the equivalent positive voltage swing. Thus, the application of a negative voltage to the anode of the tunnel diode 28, throughout a limited range will produce a reverse current, as will the application of a positive voltage to the cathode of the tunnel diode 38 throughout a limited range. Owing to this property of the diodes, no discontinuity occurs in the positive resistance region III and a continuous composite characteristic is obtained.

By a suitable choice of the magnitude of the resistor 22 and of the applied negative D.C. voltage B−, a load line A may be selected which intersects the composite characteristic at point 1 in the positive resistance region I. Point 1 thus determines the initial steady state conditions, i.e., the first stable state of the circuit. The corresponding negative voltage across the diode combinations 28, 38 is seen to be $V_1$ and the steady state current flowing through the diode combination is $I_1$.

If a positive input trigger pulse $\Delta V_A$ is applied to the input terminal 42 so that the resultant voltage across the diode combination increases to $V_4$, the current flow in the diode combination at first increases at a rate determined by the circuit time constant. This current increase carries past the peak current level $I_2$, which corresponds to the peak instability point 2, and then to the current level $I_3$. Upon reaching the instability point 2, the circuit operation switches substantially instantaneously to point 3 in the positive resistance region III. In view of the fact that the voltage $V_3$ which corresponds to point 3 cannot be sustained by the applied voltage $V_4$, the circuit operation immediately shifts down to point 4 which is defined by the intersection of the new circuit load line B and the composite characteristic.

The amplitude $\Delta V_A$ of the applied positive trigger pulse must be sufficiently large to switch the circuit operating point to the positive resistance region III where stable circuit operation is possible. In the example under consideration, the operating point is switched to the portion IIIA of the region III. The resultant negative voltage across the diode combination must not only be less than $V_2$, which corresponds to the instability point 2, but must actually be less than the voltage $V_5$ corresponding to the instability point 5, so that the circuit will be switched to the positive resistance region III.

The circuit operation remains at point 4 which constitutes the second stable state of the circuit and has current and voltage values $I_4$ and $V_4$ respectively. Upon the termination of the applied positive input pulse, the current in the diode combination declines at a rate governed by the circuit time constant past the valley level $I_5$ to $I_6$. Upon reaching the instability point 5, the circuit operation shifts substantially instantaneously to point 6 in the positive resistance region I. Thereafter, the circuit operation reverts to the steady state operating point 1 at a rate which is again determined by the circuit time constant. Upon reaching point 1, the circuit is said to have been reset to its original stable state.

Figure 3:
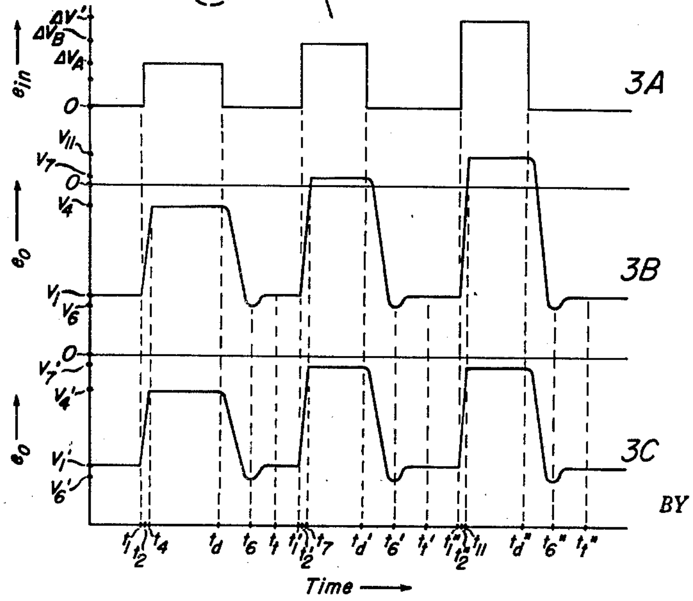
FIGURE 3 illustrates pertinent wave forms of the input and output signals of the circuit.

The above-discussed circuit operation will become clear from a consideration of FIGURES 3A and 3B which represent the voltage wave forms of the applied input signal $e_{in}$ and of the output signal $e_o$ respectively. Wherever possible, the points on the time axis of these figures have been labeled with subscripts which correspond to the appropriate operating points on the composite characteristic of FIGURE 2. The negative steady state voltage across the diode combination which represents the first stable state of the circuit is seen to be $V_1$. Upon the application of a positive input pulse having an amplitude $\Delta V_A$ at time $t_1$, the output voltage rises past the instability point 2 which is reached at time $t_2$ and reaches the level $V_4$ at time $t_4$. This voltage level, which is still negative, represents the second stable circuit state for the particular circuit operating conditions.

The output voltage remains at $V_4$ until the time $t_d$ which indicates the end of the duration of the input pulse. At time $t_d$ a decrease of the output voltage is initiated at a rate determined by the circuit time constant. The output voltage reaches its lowest level $V_6$ at time $t_6$, i.e., after the diode current has declined to $I_5$ to cause the circuit to reach the valley point 5 and to switch back substantially instantaneously to the positive resistance region I. Thereafter, the output voltage increases at the time constant rate until the level $V_1$ is again attained at time $t_t$ and the circuit is ready for the application of another input pulse.

As previously explained, that portion of the composite characteristic which is primarily located in the neagtive quadrant of the composite characteristic graph, i.e., the quadrant determined by the negative voltage and current values in FIGURE 2, corresponds to the diode 38. Accordingly, during the above-discussed circuit operation, only the diode 38 switches from one positive resistance region to another. The condition of the diode 28 remains unchanged during this period even though the current flowing through it changes.

FIGURE 3C illustrates the wave form of the output signal $e_o'$ which is obtained at the output terminal 46 during the corresponding time interval. The steady state voltage of the output pulse which occurs between $t_1$ and $t_t$ is seen to be $V_1'$. This voltage level, which is representative of the first stable state of the circuit, is less than the equivalent voltage $V_1$ by an amount equal to the voltage drop across the tunnel diode 28. The application of an input pulse at time $t_1$ having an amplitude $\Delta V_A$ produces an output pulse at the terminal 46 whose absolute amplitude is $V_4'$. This voltage level is representative of the second stable state of the circuit. The absolute amplitude $V_4'$, is less than $V_4$, by an amount equal to the voltage drop across the tunnel diode 28. It will be noted that the relative amplitude of the output pulse, i.e. $(V_4'-V_1')$, is equal to the relative amplitude $(V_4-V_1)$ of the corresponding output pulse in FIGURE 3B. The level $V_4'$ is maintained until the time $t_d$ when the output voltage $e_o'$ begins to decline at the time constant rate. The low point $V_6'$ is reached at time $t_6$, whereupon the level rises back to $V_1'$.

As previously pointed out, the applied positive trigger pulses must be sufficiently large to cause the total voltage across the diode combination to decrease below $V_5$, for the circuit to switch to its second stable state. Similarly, unless the applied positive trigger pulses are so large as to cause the total voltage across the diode combination to exceed $V_9$, the circuit will remain in its second stable state. This is true even though the output pulse may be sufficiently large to drive the absolute ouput voltage into the positive region. It follows, that the second stable state may be represented by a voltage level which is chosen from a relatively large voltage range.

Although in practice the input pulses (and consequently the output pulses) for the same stable circuit will have the same amplitude, the above-described situation is illustrated by the application of a positive input pulse $\Delta V_B$ which is larger than $\Delta V_A$, is illustrated between $t_1'$ and $t_d'$ in FIGURE 3A. This input pulse produces an increased current flow in the diode combination which shifts the operating point from the steady state point 1 to the instability point 2 at a rate determined by the circuit time constant. The circuit operation switches to the positive resistance region III substantially instantaneously, the amplitude $\Delta V_B$ of the applied positive input pulse being sufficiently large to drive the circuit to point 7 in the positive portion IIIB. The operating point 7 still represents the second stable state of the circuit and has corresponding current and voltage values $I_7$ and $V_7$ respectively.

The circuit remains in its second stable state until the end of the input pulse when the current in the diode combination begins to decrease at a rate governed by the circuit time constant. Upon reaching the instability point 5, the circuit operation switches substantially instantaneously to point 6 in the positive resistance region I. Subsequently, the current increases to the level $I_1$ at a rate determined by the circuit time constant.

During the foregoing operation, the diode 38 again switches from the positive resistance region I to the positive resistance region III and back again, while the diode 28 operates only in the region I. The output pulse which corresponds to the pulse $\Delta V_B$ occurs between $t_1'$ and $t_t'$ and appears in FIGURE 3B. The output voltage is first driven past the instability point 2 at time $t_2'$ and subsequently past the zero voltage level to the positive value $V_7$ which is reached at time $t_7$. The voltage level $V_7$ which represents the second stable state of the circuit is maintained until the time $t_d'$ when the applied input pulse ceases. The output voltage declines at the time constant rate past the zero voltage point and, upon switching back to the positive resistance region I, it reaches its lowest point at time $t_6'$. Subsequently, the voltage rises to the value $V_1$ at the time constant rate until the circuit is again ready to accept an input pulse at time $t_t'$.

The output signal $e_o'$ which appears at the output terminal 46 during the period $t_1'$ to $t_t'$ is illustrated in FIGURE 3C. The output voltage is seen to rise from the initial steady state level $V_1'$ to the value $V_7'$ which is reached at time $t_7$. As in the case of FIGURE 3B, this level of the output pulse is maintained until the time $t_d'$ when the output voltage declines at the time constant rate to $V_6'$ and subsequently rises to $V_1'$ at the time constant rate until the operation is completed at time $t_t'$. As in the case discussed in connection with the time interval $t_1$ to $t_t$, the relative amplitude of the output pulse of the signal $e_o'$ is equal to that of the corresponding pulse of the output signal $e_o$. The absolute pulse amplitude $V_7'$, however, is less than the corresponding voltage level $V_7$ by an amount equal to the voltage drop across the tunnel diode 28. The voltage level $V_7'$ again is equivalent to the second stable voltage level of the output signal $e_o'$ which is derived at the output terminal 46.

From the foregoing explanation it will be clear that the amplitude of the applied input pulses for operation in the second stable circuit state may vary from $\Delta V_A$ to $\Delta V_B$, while the level of the output signal may range from $V_4$ to $V_7$. Similarly, the output signal $e_o'$ may vary from $V_4'$ to $V_7'$.

When an input pulse having an amplitude $\Delta V'$ is applied to the input terminal 42 at time $t_1''$, the operating point of the circuit initially shifts past the instability point 2 and past the zero voltage level, to the level $I_{10}$ at a rate determined by the circuit time constant. The circuit switches substantially instantaneously from point 2 to the operating point 10 in the positive resistance region V of the composite characteristic. Since the applied voltage is only sufficient to sustain a voltage $V_{11}$ across the diode combination, the circuit shifts down immediately to the stable operating point 11. The latter represents the third stable state of the circuit and has corresponding positive current and voltage values $I_{11}$ and $V_{11}$ respectively.

The circuit is maintained in its third stable state until the termination of the input pulse at time $t_d''$. Subsequently, the diode current declines at the circuit time constant rate until it reaches the positive current level $I_9$ which corresponds to the instability point 9. This causes the diode to switch substantially instantaneously from point 9 past the zero voltage point to point 6 in the positive resistance region I. Thereafter, the current in the diode combination increases at the time constant rate to the steady state level $I_1$ until the stable operating point 1 is again reached.

It will be obvious that in the foregoing operation both diodes 38 and 28 switch positive resistance regions. The operation will become clear from FIGURE 3A where the input pulse which is applied between $t_1''$ and $t_d''$ is seen to have an amplitude $\Delta V'$. The level of the responsive output voltage wave form rises between time $t_1''$ and time $t_{11}$ when the stable voltage level $V_{11}$ is reached. The latter voltage level, which is representative of the third stable state of the circuit, is maintained until the time $t_d''$ when the applied input pulse is terminated. The decline of the output voltage at a rate governed by the circuit time constant is initiated and carries the output signal past the zero voltage point to its low point $V_6$ at time $t_6''$. Thereafter, the output voltage increases at the circuit time constant rate until the steady state level $V_1$ is again attained.

The pulsed output signal $e_o'$ which corresponds to the applied input pulse $\Delta V'$ is seen to rise only to the upper range limit $V_7'$ of the second stable voltage level. This action is due to the fact that the output signal $e_o'$ is derived across the tunnel diode 38 and remains unaffected by the switching action of the diode 28. The output signal $e_o'$ therefore has only two stable voltage levels $V_1'$ and $V_4' \rightarrow V_7'$, despite the fact that three different input signals 0, $\Delta V_A \rightarrow \Delta V_B$ and $\Delta V'$ may be applied to the input terminal 42.

It follows from the foregoing discussion that the embodiment of the invention which is illustrated in FIGURE 1 may be switched selectively to any one of three stable states by the application of three different input pulses each representing a unique combination of polarity and amplitude. A pair of responsive output signals is derived, one having three distinct stable voltage levels, and one having two distinct stable voltage levels.

It will be understood that the sequence of input pulses representative of the respective stable states which is shown in FIGURE 3A is illustrative only and that the order in which the input pulses of different amplitude are applied is governed entirely by the particular logical operation which the circuit is called upon to perform. Moreover, input pulses representative of different stable states may be applied in overlapping time relationship whereby the circuit is compelled to switch, e.g., from its second to its third stable state directly without reverting to the steady state conditions which represent its first stable state.

As previously explained, the logical gain of the circuit depends on the proper choice of the circuit time constant. The latter in turn, by controlling the slope of the trailing pulse edge, determines the width of the output pulse. Suitable gain adjustments may be made by adjusting the value of the inductive impedance. The circuit of the invention thus is not only capable of providing an appreciable amount of logical gain, but is moreover, self-resetting, i.e., capable of restoring itself to its initial operating conditions without requiring an additional restoring signal.

The selection of the load line determines the stable circuit operating conditions. The initial steady state point may be chosen anywhere in the positive resistance regions, as for example at the stable operating points 1, 4, 7 and 11, which have corresponding load lines A, B, C and D respectively. The choice of the initial operating point determines the polarity and amplitude of the input pulses required to switch the circuit operation between the aforesaid stable operating points. By biasing for steady state conditions at points 4 or 7, the operation becomes equivalent to that of a circuit having four distinct stable states, wherein the application of four different input pulses having unique polarity and amplitude combinations results in four correspondingly distinct output pulses. For example, if the point 7 is chosen as the initial steady state point of the circuit, the voltage $V_7$ represents the first stable level of the output signal $e_o$. If a positive pulse with an amplitude $\Delta(V_{11}-V_7)$ is applied the circuit is switched to point 11 and a positive output pulse which has a second stable output signal level $V_{11}$ is obtained. A negative pulse having an amplitude $\Delta(V_4-V_7)$ is required to drive the circuit to the point 4 and, although it does not cause any of the diodes to switch, it results in a negative output pulse having a third stable signal level $V_4$. A negative pulse having an amplitude $\Delta(V_1-V_7)$ will shift the circuit operation to the point 1 to provide a negative output pulse having a fourth stable signal level $V_1$. The actual circuit operation which takes place in each of these cases is similar to that described above.

In the instant example, the output signal $e_o'$ will have three stable voltage levels $V_7'$, $V_4'$ and $V_1'$ in response to input pulses of 0, $\Delta(V_4-V_7)$ and $\Delta(V_1-V_7)$ amplitude respectively. As before, although the relative pulse amplitude of $e_o'$ will be the same as that of $e_o$, the absolute signal amplitude, as designated by the prime numbers above, will be less by an amount equal to the drop across the diode 28. The amplitude of the output signal $e_o'$ in response to a pulse $\Delta(V_{11}-V_7)$ will also be $V_7'$ owing to the fact that the output signal is not affected by the switching action of the diode 28. From the foregoing discussion it will be clear that, by properly biasing the circuit of FIGURE 1 for steady state operation at points 7 or 4, and applying four different input pulses, each representative of a unique polarity and amplitude combination, a pair of output signals $e_o$ and $e_o'$ may be derived having four and three distinct stable voltage levels respectively.

If a resistor is connected between the anode of the tunnel diode 38 and ground, a signal which is the logical inverse of that obtained at the output terminal 44 may be derived across the resistor. The effect of such a resistor, moreover, is to distort certain sections of the composite diode characteristic to an extent where two values of voltage or current exist for a single applied current or voltage input signal respectively. A similar circuit modification is fully discussed in the abovementioned copending application. The underlying principles of operation are equally applicable to the present invention.

Although the invention requires a pair of oppositely poled diodes, these need not have their cathodes connected together. An operative circuit may also be obtained by connecting the anodes of the two diodes and applying a negative bias voltage through a resistor-inductance combination.

In accordance with the principles disclosed in the aforementioned copending application, it is also possible to connect additional diodes in series with the combination of diodes 28 and 38. Thus, if a tunnel diode were connected between the anode of the diode 28 and the junction point 24 and if it were poled in the same direction as the diode 28, the effect would simply be to extend the composite characteristic in a manner indicated in broken outline in FIGURE 2. A similar extension is possible in the negative quadrant of FIGURE 2 by connecting a tunnel diode between ground and the anode of the diode 38 which is poled in the same direction as the latter. Preferably, the additional diode has a peak current which is higher than that of the diode to which it is connected.

Suitable substitutions may be made for the single resistor 22 and for the inductance 20, provided that the resultant reactive impedanec of such a circuit remains the same. While identical tunnel diodes 28 and 38 have been shown, i.e., diodes which have the same peak current and valley current for an equivalent voltage swing, the invention is not so limited. Similarly, although the input has been assumed to be a voltage source, i.e., a source having a low internal resistance so as to apply pure voltage pulses to the input terminal 42, other trigger sources, such as a current source, may be substituted. Under certain conditions, the trigger input pulses may be applied in series with the DC bias source.

It will be apparent from the foregoing discussion that numerous modifications, changes and equivalents will now occur to those skilled in the art, all of which fall within the true spirit and scope contemplated by the invention.

What we claimed is:

1. A circuit for performing logical functions comprising, a resistive and an inductive impedance connected in series combination and having one terminal connected to a junction point, a pair of oppositely poled tunned diodes connected in series between said junction point and a reference point, each of said diodes having a characteristic including a pair of positive resistance regions each adjacent an instability point, said individual diode characteristics forming a composite characteristic of said diode combination adapted to provide at least three stable diode operating points, means for applying a bias voltage between the other terminal of said series impedance combination and said reference point to provide monostable diode operation at an initially chosen one of said stable operating points, and means for applying different trigger input pulses to said junction point to shift the circuit operation to selected ones of said stable operating points, different ones of said trigger pulses representing unique combinations of amplitude and polarity.

2. A circuit for performing logical functions comprising, a resistive and an inductive impedance connected in series combination and having one terminal connected to a junction point, a diode combination consisting of a pair of tunnel diodes connected in back-to-back relationship, the anodes of said diodes being connected to said junction point and to a reference point respectively, each of said diodes having a characteristic including a pair of positive resistance regions each adjacent an instability point, said individual diode characteristics forming a composite characteristic of said diode combination including three positive resistance regions each adapted to contain at least one stable diode operating point, means for applying a bias voltage between the other terminal of said series impedance combination and said reference point to provide monostable diode operation at an initially chosen one of said stable operating points, and means for applying different trigger input pulses to said junction point to shift the circuit operation to selected ones of said stable operating points.

3. The apparatus of claim 2 and further comprising means for deriving an output signal from said junction point having at least three stable signal levels.

4. The apparatus of claim 2 and further comprising means for deriving an output signal from the common connection point of said diodes having at least two stable signal levels.

5. A circuit for performing logical functions comprising, at least a pair of oppositely-poled tunnel diodes connected in series combination, each of said diodes having a characteristic including a pair of positive resistance regions each adjacent an instability point, said individual diode characteristics forming a composite characteristic of said series combination adapted to provide different stable diode operating points in the positive and negative voltage ranges respectively, means for resistively coupling a bias voltage to said series combination adapted to provide monostable diode operation at an initially chosen one of said stable operating points, and means for applying different trigger pulses to one end of said series combination to shift the circuit operation to selected ones of said stable operating points, different ones of said trigger pulses representing unique amplitude and polarity combinations.

6. A circuit for performing logical functions comprising, a reactive impedance connected to a junction point, at least a pair of oppositely poled tunnel diodes connected in series combination to said junction point, each of said diodes having a characteristic including a pair of positive resistance regions each adjacent an instability point, said individual diode characteristics forming a composite characteristic of said series combination having at least three positive resistance regions adapted to contain at least one stable diode operating point, means for resistively coupling a bias voltage to said junction point to provide monostable diode operation at an initially chosen one of said stable operating points, and means for applying different trigger input pulses to said junction point to shift the circuit operation to selected ones of said stable operating points.

7. A circuit for performing logical functions comprising, a diode combination including at least a pair of oppositely poled diodes connected to each other, each of said diodes having a characteristic including a negative resistance region located intermediate a pair of positive resistance regions and separated therefrom by a pair of instability points, said individual diode characteristics forming a composite characteristic of said diode combination adapted to provide different stable operating points, means for resistively coupling a bias voltage to said series combination adapted to provide monostable diode operation at an initially chosen one of said stable operating points, and means for applying different trigger pulses to said junction point to shift said circuit to selected ones of said stable operating points.

8. A circuit for performing logical functions comprising, a diode combination including at least a pair of tunnel diodes connected in an oppositely poled series combination, each of said diodes having a characteristic including a pair of positive resistance regions each adjacent an instability point, said individual diode characteristics forming a composite characteristic of said diode combination adapted to provide different stable operating points, one of each pair of instability points associated with each diode having a unique peak current level, means for resistively coupling a bias voltage to said series combination for monostable diode operation at an initially chosen one of said stable operating points, and means for applying different input pulses to said junction point to shift said circuit to selected ones of said stable operating points.

9. A circuit for performing logical functions comprising, a resistive and an inductive impedance connected in series combination and having one terminal connected to a junction point, at least a pair of oppositely poled tunnel diodes connected in series combination between said junction point and a reference point, each of said diodes having a characteristic including a pair of positive resistance regions each adjacent an instability point, said individual diode characteristics forming a composite characteristic of said diode combination having at least three positive resistance regions each adapted to contain at least one stable operating point, one of each pair of instability points associated with each diode having a unique peak current level, means for applying a bias voltage between the other terminal of said series impedance combination and said reference point to provide monostable diode operation at an initially chosen one of said stable operating points, and means for applying different input trigger pulses to said junction point to shift said circuit to selected ones of said stable operating points, each of said trigger pulses representing a unique combination of amplitude and polarity.

10. A circuit for performing logical functions comprising a resistive and an inductive impedance connected in series combination and having one terminal coupled to a junction point, at least first and second oppositely poled tunnel diodes connected in series combination between said junction point and a reference point and having diode characteristics predominantly located in the positive and negative voltage ranges respectively, the composite characteristic of said diode combination formed of said individual diode characteristics including at least first and second positive resistance regions located in said positive and negative voltage ranges respectively and further including a third positive resistance region extending into both said voltage ranges, each of said positive resistance regions being adapted to support stable diode operation, a pair of instability points associated with each of said diodes, one of each of said pairs of instability points having a unique peak current level, means for biasing said diode combination for steady state operating conditions in one of said positive resistance regions, and means for triggering said circuit with pulses representing unique combinations of amplitude and polarity to switch the circuit operation selectively away from said steady state conditions for the pulse duration.

11. A circuit for performing logical functions comprising a resistive and an inductive impedance connected in series combination and having one terminal coupled to a junction point, at least first and second oppositely poled tunnel diodes connected in series combination between said junction point and a reference point and having diode characteristics predominanatly located in the positive and negative voltage ranges respectively, the composite characteristic of said diode combination form of said individual diode characteristics including at least a first and second positive resistance regions located in said positive and negative voltage ranges respectively and further including a third positive resistance region extending into both said voltage ranges, each of said positive resistance regions being adapted to support stable diode operation, a pair of instability points associated with each of said diodes, one of each of said pairs of instability points having a unique peak current level, means for applying a bias voltage between the other terminal of said series impedance combination and said reference point to provide monostable steady state diode operation in a selected voltage range of said third positive resistance region, means for applying different trigger pulses to said junction point representative of unique amplitude and polarity combinations, said trigger pulses being adapted to shift the operation of said circuit for the pulse duration to a chosen positive resistance range in a chosen voltage range, said circuit being adapted to return to the steady state conditions in response to the termination of each of said trigger pulses, and means for deriving an output signal between said first tunnel diode and said reference point, said output signal having at least four distinct stable signal levels.

12. The apparatus of claim 11 and further comprising means for deriving an additional output signal between said second diode and ground, said last-recited output signal having at least three distinct stable signal levels.

13. A self-resetting, multistable circuit for performing logical functions comprising a resistive and an inductive impedance connected in series combination and having one terminal connected to a junction point, at least a pair of oppositely poled tunnel diodes connected in series with each other, the anodes of the first and the last one of said series-connected diodes being connected to said junction point and to said reference point respectively, each of said diodes having a characteristic including a pair of positive resistance regions each adjacent an instability point, said individual diode characteristics forming a composite characteristic of said series-connected diodes adapted to provide a plurality of stable operating points each located in one of said positive resistance regions, means for applying a bias voltage between the other terminal of said series impedance combination and said reference point to provide monostable diode operation at an initially chosen one of said stable operating points, means for selectively applying different input trigger pulses to said junction point each adapted to shift said circuit to a different one of said stable operating points and to substantially maintain it there for the pulse duration, said circuit being adapted to return to said initially chosen stable operating point in response to the termination of each of said trigger pulses, and means for deriving output signals from said circuit between at least one of said diodes and said reference point.

14. A self-resetting, multistable circuit for performing logical functions comprising, a first resistive impedance and an inductive impedance connected in series combination and having one terminal connected to a junction point, first and second oppositely poled substantially identical diodes connected in series with each other and having their anodes connected to said junction point and to ground respectively, the characteristics of said first and second diodes being predominantly located in the positive and negative voltage ranges respectively, and each including a negative resistance region intermediate a pair of positive resistance regions and separated therefrom by a pair of instability points, said individual diode characteristics forming a continuous composite characteristic including one positive resistance region extending into both of said voltage ranges, each of said positive resistance regions being adapted to support stable diode operation, means for applying a D.C. bias voltage between the other terminal of said series impedance combination and ground, said D.C. bias being adapted to define monostable steady state conditions of said circuit at an operating point in an initially chosen voltage range of said one positive resistance region, and means for selectively applying three different trigger input pulses to said junction point each representing a unique polarity and amplitude combination and each adapted to switch the circuit to a different operating point for the pulse duration, one of said trigger pulses being adapted to shift the circuit operation to the other voltage range of said one positive resistance region, the other two of said trigger pulses being adapted to shift said circuit operation beyond one of said instability points to a selected one of the other positive resistance regions, said circuit being adapted to return to said steady state conditions in response to the termination of each of said trigger pulses.

15. The apparatus of claim 14 and further comprising means for deriving an output signal between said junction point and ground having four distinct stable signal levels.

16. The apparatus of claim 14 and further comprising means for deriving an output signal between the connection point of said diode pair and ground having three distinct stable signal levels.

References Cited in the file of this patent

UNITED STATES PATENTS 2,837,652 Nailen ---------------- June 3, 1958

OTHER REFERENCES

The International Solid-State Circuits Conference Digest of Technical Pages (Fig. 1 of page 52, session V, entitled "Information Storage Techniques" held on February 11, 1960, relied upon).

I.R.E. Wescon Convention Record, vol. 3, part 3, page 24, Fig. 11, August 21, 1959, by Lesk et al.